Figure 1:
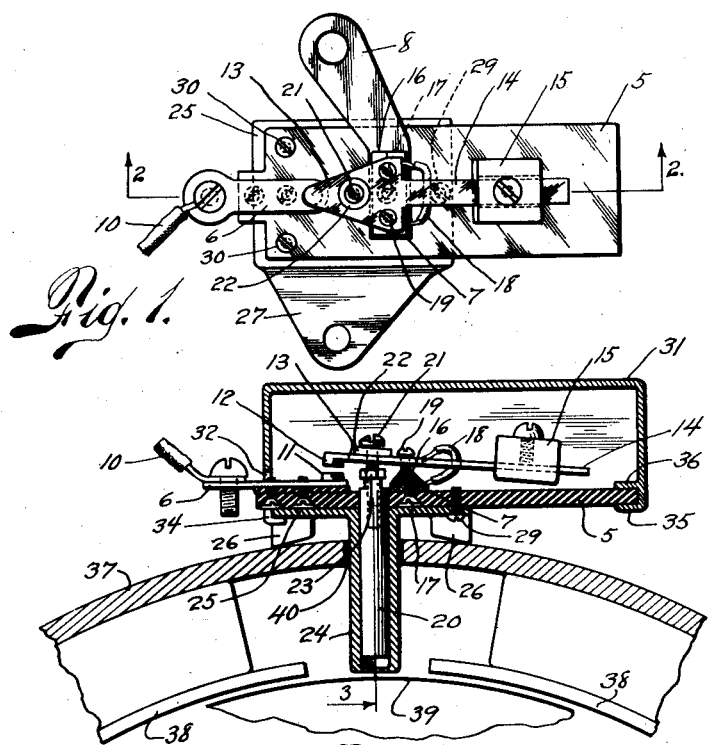

Dec. 18, 1928.

R. C. BIERBOWER 1,696,107

AUTOMATIC MAGNETIC SWITCH

Filed April 12, 1927

Witness
John B. Dade.

Inventor
R. C. Bierbower.
by Wilkinson & Giusta
his Attorneys

Patented Dec. 18, 1928.

1,696,107

UNITED STATES PATENT OFFICE.

RICHARD C. BIERBOWER, OF SAN ANTONIO, TEXAS.

AUTOMATIC MAGNETIC SWITCH.

Application filed April 12, 1927. Serial No. 183,100.

This invention relates to automatic magnetic switch arrangements employed as automatic controllers, cut-outs, or reverse current relays, disposed in the charging circuit, between the generator and storage battery, of storage battery charging systems.

Although the improvements are such as to be well adapted for use in various other analogous relations, such as with electric generation and storage equipment of railway rolling stock, and in fact with analogous storage battery charging systems in general, still the invention has been designed primarily with reference to the electric systems of automotive vehicles, for starting, lighting and other purposes. Accordingly, for the sake of brevity and simplicity of illustration, I shall only disclose the invention with particular reference to such electric systems for automotive vehicles, but it is with the understanding that I do not limit the same to this or any one particular sphere of use.

In such systems, if the storage battery were at all times directly connected in circuit with the generator, the battery would immediately commence to discharge through the generator as soon as the speed of the latter fell to a point where the generator was no longer producing sufficient voltage to charge the battery; and if the generator were free to run, instead of being in positive gear with the vehicle's engine, it would become "motorized" and operate as an electric motor utilizing the storage battery current and thus exhausting the latter, all of which is well understood. Consequently, as is also well understood, it is necessary to have an automatically operating switch arrangement, disposed in the charging circuit, functioning to close the circuit, between the storage battery and its generator, when the speed of the latter is developed to a certain point, and to open said circuit upon said speed falling below that point. Such devices are commonly termed commercially, and generally designated in the art, as automatic controllers, cut-outs, reverse current relays, or the like.

As heretofore proposed, however, such automatically operating switching means embody, as essential elements, a spring retracted make-and-break contact lever with an attracting electro-magnetic iron core therefor which, when functioning properly, is magnetized and demagnetized by virtue of paired windings or coils associated therewith, and one of which windings, consisting of many turns of fine insulated wire, is connected "in shunt" or directly across the two main brushes or terminals of the generator, receiving the full voltage therefrom, whereas the other one of the coils, consisting of a few turns of heavy insulated wire, is connected "in series" with the battery and generator, through the make-and-break contact points.

Although these prior types of devices have in a large measure very materially advanced the art, still the aforestated and other defects thereof, unnecessary to fully enumerate herein, render even them open to many serious objections, and it has long since been desired to provide a more satisfactory substitute therefor.

Amongst the primary objects of my invention, therefore, I have aimed to devise an automatic magnetic switch that is of itself wholly devoid of either series or shunt windings, a switch which will operate with generators of different voltages without any change of construction, a switch in which the contact points thereof will have no tendency to stick or remain closed either upon current reversals or when the generator is idle, a switch preferably devoid of resilient retractile means, and a wholly practicable embodiment of such a switch which is not only durable and more positively operable at all times of use, but which also is so simple, with a minimum number of parts little liable to get out of order, that it may be manufactured, assembled, marketed and installed at comparatively small expense.

Figure 2:
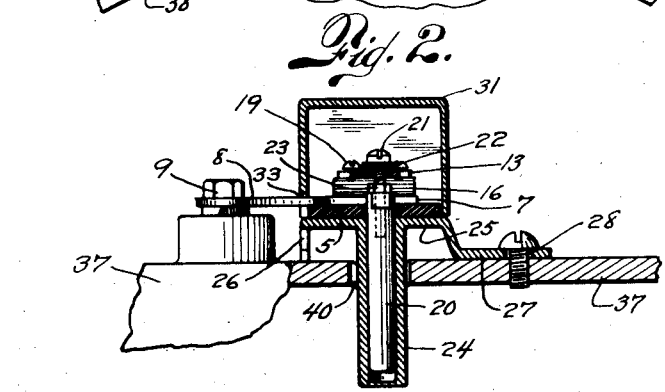

The foregoing and other objects and advantages, however, will be more clearly apparent as incidental to the following disclosure, so that nothing would be gained by further enlargement upon the same initially, excepting to state that, in the accomplishment of these ends, I utilize the variable magnetism established by the armature core of the generator itself, as will hereinafter more fully appear. With these general outlining remarks, therefore, reference will now be had to the accompanying drawings, illustrating certain practical embodiments of the improvements, although susceptible to some variations without departing from the spirit of the invention, and in which drawings Figure 1 is a top plan view of my improved device, with its protecting switch-housing cover or casing omitted; Figure 2 is a longitudinal central sectional view thereof, taken along the line 2—2 of Figure 1, with said housing supplied, and as attached to a four-pole generator, the said generator being but partly shown in transverse cross-section; and Figure 3 is a transverse vertical sectional view through the device, along the line 3 of Figure 2, as applied to a fragmentary part of said generator.

Figure 3:

The switch elements proper are carried by an insulating base plate 5, upon which is mounted suitable electric terminal members 6 and 7, the latter having an angularly disposed arm 8, projected from a transversely disposed arm indicated at 7, which angularly disposed arm is apertured for connection, as indicated at 9 of Figure 3, to a terminal post of the battery charging generator. The switch terminal member 6 is adapted for connection with a lead wire 10 extending directly, as a part of the battery charging circuit, to the appropriate terminal of the storage battery. This switch terminal member 6 is provided with a fixed contact 11 that is associated with a movable contact 12 carried by the make-and-break switch lever of the device, which lever is actually illustrated as embodying an arrow-like member having a triangular head 13, with said contacts located underneath its apex, and an elongated shaft or shank 14 carrying a counterbalancing weight 15 that is adjustable therealong.

The base end of the triangular head 13, of said switch lever, is tiltingly supported upon a knife-edge trunnion 16, or its equivalent, which in turn is supported upon the transverse arm 7 of the switch terminal member 7—8, the trunnion element and said arm 7 being securely held together and to said dielectric base 5 by any suitable means, such as screws or a screw 17 that enters said elements from the underneath face of said insulating base 5.

As a matter of fact there is electrical contact between the switch terminal member 7—8, the trunnion bearing 16 and the switch contact lever 13—14, but to make the circuit more positive I prefer to employ a short hot-wire connection 18 directly between the arm 7 and the switch lever head 13, as is fully understood.

The said switch contact lever is preferably retained in position upon its bearing, in tilting pivotal relation, as by means of adjusting screws 19, the shanks of which are loosely disposed in apertures through the lever, which screws are threaded into the apex of said bearing 16. By appropriate adjustment of these screws 19, therefore, the degree of the opening gap between the contacts 11 and 12 may be regulated to a nicety; and of course it will be understood that the adjustable counterbalancing weight 15, which is shown in an extreme position for clearness of the drawings, likewise provides a nicety of control for the actual degree of pull and retractile force or tension desired to be exerted upon the switch contact lever in the closing and opening movements between the contacts 11 and 12.

As a matter of fact, the switch contact lever could be in the nature of a flat spring, supported at its end opposite to its contact end, in which event the intermediate bearing 16 would be dispensed with, or it could be as illustrated but with any suitable spring tension substituted for the counterbalancing weight control. In actual practice, however, I find that better results are obtained without the employment of any spring retractile control, and accordingly I prefer the adjustable counterbalancing weight arrangement, for reasons hereinafter appearing.

At a suitable position of the switch contact lever, intermediately of its pivotal support and contact point 12, there is provided a depending soft iron core, which is freely suspended and insulated therefrom. This core is illustrated as a soft iron rod 20 that is suspended by a threaded head projection, such as a headed screw 21, passing freely through a di-electric washer or bushing 22 that has a reduced portion extending through an aperture of the head 13 of the switch lever. The shank of said screw 21 is provided with a lock nut 23 for so engaging the head of said rod 20 as to leave a slight clearance space between said nut and lever, whereby true linear reciprocation of said rod is provided for, in guarding against any sticking or binding of parts owing to the slight arcuate motions of the lever, and especially as the said rod 20 is preferably encased in a tubular housing projected towards the zone of the revolubly mounted armature of the battery charging generator, all of which will hereinafter more fully appear.

This tubular housing 24 when employed, and it preferably is employed although not strictly essential to the broader improvements, comprises a brass tube-like shield that is closed at its lower end and depends from a metallic mounting plate 25, for the insulating base 5 and switch elements, the object of said element 24 being for the purpose of protecting the iron core from dirt or grease which might be thrown off from the generator armature, when revolving at high velocity, thus guarding against any sticking or hanging-up of the relay because of the gumming-up or binding of the iron core or associated parts.

The aforesaid mounting plate 25, suspending said tubular shield, also functions for the purpose of attaching the relay to the generator field housing or casing, in a direct and rigidly supported manner thereon, by means of short legs or seating lugs 26, depending from one side edge portion of said mounting plate, and a depressed foot-like projection 27 depending from the other side edge portion thereof, the projection 27 being apertured for attachment to the generator field housing, as indicated at 28. The mounting plate 25 may be secured to the insulating base 5 in any suitable way, such for instance as by means of a screw 29 at one end, entering from underneath the plate 25, and a pair of screws 30 at the other end, entering from above the base 5.

The housing cover for the switch parts simply consists of a rectangular casing 31, of thin metal, provided with an end wall clearance aperture 32 and a similar side wall aperture 33, each being sufficiently large to provide for the substantial clearance of the respective switch terminal arms 6 and 8 as projected therethrough. The open bottom of the cover box 31 snugly encompasses the insulating base 5, the lower edge of one end wall of the cover having a plurality of depending ears 34, adapted to be bent up underneath the mounting plate 25, and a similar depending ear 35 being located at the other end of the cover, for bending up underneath the insulation base 5 to hold the latter up against an inside stop lug 36 at that end, as will be obvious from Figure 2.

In the drawings, the generator is illustrated as being of a four pole type, the numeral 37 designating the generator field housing, 38 the field pole shoes thereof and 39 the rotating armature therefor, all of which are fully understood and accordingly are simply shown in more or less conventional and fragmentary form as being sufficient for general illustrative purposes.

In the application of my improvements, however, the field housing 37 is additionally provided with an aperture 40, located between a pair of the pole shoes 38, for the projection through said aperture of the iron core 20 of the relay, and its encompassing tubular brass shield 24 when employed, with the lower end thereof disposed in slightly spaced radial relation relatively to the peripheral surface of the generator armature 39.

When the relay is properly assembled and rigidly supported in place upon the generator field housing, as indicated at 9, 26 and 28 of Figures 2 and 3, and the iron core 20 together with its tubular shield being projected through the aperture 40 into association with the generator armature 39, neither the contact lever 13—14 nor the switch terminal 6 have any electrical connection with either the iron core 20 or the metal mounting base 25. Also, as the switch terminal 6, through its lead wire 10, is to be connected to the positive terminal of the storage battery, and as the switch terminal 7—8 is attached, as at 9, to the positive terminal of the generator, it follows that the negative terminal of the generator is to be connected to the negative terminal of the storage battery, and accordingly the storage battery charging circuit is closed and opened solely by way of the switch contact elements 11 and 12.

Now, when the generator is driven by its engine, say the motor of an automotive vehicle, at a speed which will produce current, the iron core of the armature 39 becomes magnetized, the magnetism increasing proportionately to the increased speed of the engine, with a consequent increase in current output, and of course the reverse of the latter will be true upon decrease in speed.

It follows, therefore, that the soft iron rod 20 will be strongly attracted towards the armature 39, by the magnetized core thereof, when the generator is producing sufficient current to charge the storage battery, thus closing the theretofore open contacts 11 and 12, against the tension or inertia of the contact lever 13—14, dependent upon whether said lever be under spring or weight retractile control, although the latter is preferred. Also, reversely, when the speed of the engine, and hence that of the generator, drops to a point where the generator voltage is less than that of the storage battery, not only will the current from the battery tend to flow back through the armature in an opposite or reverse direction, thereby tending to initially demagnetize the iron armature core, but also the magnetic pull being materially lowered, relatively to its pull when the generator is running at higher speed, its force will be counteracted by the weighted contact lever 13—14, and thus immediately open the contacts 11 and 12, for preventing any reverse discharge from the storage battery that would tend to exhaust the latter, it being understood that, by setting the weight 15 at a predetermined position along the contact lever, the relay may be so delicately adjusted that the contacts 11 and 12 will be caused to open and close at any predetermined desired speed of the generator.

Although I have thus fully set forth the improvements in accordance with my present preferences, it nevertheless will be understood that I do not wish to unnecessarily confine myself to all details exactly as disclosed, excepting as they may be embodied in the steps, or come within the terms or tenor of the claims, or equivalents thereof, or as fairly interpreted in the light of the specification if necessary.

What I do claim, as new and patentable, is:

1. An automatic magnetic switch device operable by extraneous magnetism, embodying an insulating supporting base, a terminal member having a contact element, a second terminal member, a retractive lever in electrical connection with said second terminal member and carrying a contact element in normally spaced complementary relation with said first contact element, a magnetically attractable core element suitably suspended from said lever at a position thereof between its contact and fulcruming positions, and a non-magnetic metallic mounting support, for said insulating base, provided with a non-magnetic casing that houses said core element.

2. An automatic magnetic switch device operable by extraneous magnetism, embodying an insulating base, a contact element on the base, a lever having a second contact element in normally spaced complementary relation with the first named contact element, a magnetically attractable core suspended from said lever for closing the contact elements when attracted, and a non-magnetic metallic mounting support for said insulating base provided with a non-magnetic casing housing said core.

3. An automatic magnetic switch device operable by extraneous magnetism comprising normally separated contacts, a lever carrying one of the contacts biased to a position in which the contacts are separated, a magnetically attractable core coupled to said lever for moving the lever to close the contacts when the core is attracted, an insulating supporting base for the contacts and lever, and a non-magnetic mounting for the insulating supporting base provided with a non-magnetic casing housing the core.

4. The combination with a shunt-wound generator having an armature, a switch having contacts in the load circuit of the generator and including a magnetically-attractable member for closing the switch when attracted, said member being located in closely spaced relation with respect to the armature whereby the member will be attracted to close the switch by the direct magnetic action between said member and the armature.

5. The combination with a self-excited generator, and a normally open switch disposed in the work circuit of the generator, magnetically-attractable means associated with the switch for closing the same and located in close but spaced proximity with respect to the generator armature whereby to be attracted toward the armature to close the switch only by the direct magnetic action set up between said means and the armature.

6. The combination with a shunt-wound generator, and a switch in the generator load circuit biased to an open position, a magnetic core coupled to the switch and extending between the pole-pieces of the generator in close proximity to the armature whereby to be attracted only by the direct magnetic action between the core and generator armature.

7. The combination with a generator, and a switch having normally open contacts disposed in the generator load circuit, of a magnetic means for closing the switch located in spaced but close proximity to the generator armature for being attracted by the direct magnetic action between the means and armature.

In testimony whereof, I affix my signature.

RICHARD C. BIERBOWER.